United States Patent [19]

Kassai

[11] Patent Number: 4,741,544
[45] Date of Patent: May 3, 1988

[54] TOY VEHICLE

[75] Inventor: Kenzou Kassai, Osaka, Japan

[73] Assignee: Aprica Kassai Kabushiki Kaisha, Osaka, Japan

[21] Appl. No.: 2,958

[22] Filed: Jan. 13, 1987

[30] Foreign Application Priority Data

Jan. 29, 1986 [JP] Japan .............................. 61-12344[U]
Jan. 29, 1986 [JP] Japan .............................. 61-12345[U]

[51] Int. Cl.⁴ ............................................. A63G 19/18
[52] U.S. Cl. ..................................... 280/113; D21/74
[58] Field of Search .................. 280/1.13, 1.16, 1.165, 280/1.201, 1.202, 1.203, 1.22, 289 WC; 446/275; D21/74, 75, 78

[56] References Cited

U.S. PATENT DOCUMENTS

| D. 215,990 | 11/1969 | Faulhaber | 280/1.13 X |
| D. 262,385 | 12/1981 | Nakao et al. | D21/78 |
| 2,723,128 | 11/1955 | Kelly et al. | 280/1.13 X |
| 2,866,649 | 12/1958 | West | 280/1.13 X |
| 4,261,588 | 4/1981 | Kassai | 280/7.17 |
| 4,264,080 | 4/1981 | Kassai | 280/1.13 |
| 4,424,978 | 1/1984 | Kassai | 280/1.13 |

Primary Examiner—John A. Pekar
Attorney, Agent, or Firm—W. G. Fasse; D. H. Kane, Jr.

[57] ABSTRACT

A toy vehicle having a vehicle body formed with a hood portion in the front region and with a seat in the rear region for a child to sit thereon, and a handle post upwardly extending from the front region of the vehicle body to form grips to be gripped by a child sitting on the seat. An accessory in the form of a flat plate simulating a driver's face is attached in its upright position to the handle post. A plug-in member simulating a head light is removably fitted in the hood portion. Another accessory in the form of a flat plate simulating a steering wheel and a driver's hands gripping it is attached by being held by the fitting portion of the plug-in member.

10 Claims, 4 Drawing Sheets

TOY VEHICLE

BACKGROUND OF THE INVENTION

1. Field of the Invention

This invention relates to a toy vehicle, particularly to improvements for changing the external appearance of a toy vehicle to offer a variety of goods at low cost.

2. Description of the Prior Art

Among toy vehicles to be enjoyed by children by riding them, are the type having four wheels and a seat on which a child sits while his hands hold grips and while he kicks the ground with his feet to drive the toy vehicle (see, for example, U.S. Pat. Nos. 4,261,588, 4,264,080 and 4,424,978), and a child's tricycles.

In toy vehicles as described above, to meet consumers' varying tastes, it would be necessary to prepare various toy vehicles having different appearances. To change the appearance externally by changing the shape of the body of the aforesaid four-wheeled toy vehicle, is not desirable, since it will incur a considerable cost increase. Generally, such a vehicle body is made of rigid plastic material; thus, to change the shape of the vehicle body, a number of expensive metal molds have to be prepared.

SUMMARY OF THE INVENTION

Accordingly, an object of the invention is to provide a toy vehicle arranged so that the external appearance can be easily changed.

According to the invention, an accessory is attached to a toy vehicle which, like the aforesaid four-wheeled toy vehicle or child's tricycle, comprises an upwardly projecting handle post disposed in the front region and formed with grips to be held by a child with his hands, and a seat formed in the rear region for a child to sit on. This accessory has a form which represents the driver's face. The accessory has attached means added thereto for attaching the accessory to the handle post or some other place near the handle post.

Since the accessory is arranged to be attached to the handle post or some other places place located in the front region of the toy vehicle in this manner, attaching such accessory to the toy vehicle changes the external appearance of the front region of the toy vehicle which greatly influences the design of the entire toy vehicle, with the result that the impression conveyed by the external appearance of the toy vehicle can be changed to a large degree.

Further, since the accessory has a form which represents the driver's face, the accessory, when attached to the front region of the toy vehicle, can change the interesting external appearance. For example, such accessory can give an impression as if it were the driver actually driving the toy vehicle. In this connection, toy vehicles simulating animals have already been developed and put on the market. If accessories simulating animals' faces are attached to toy vehicles, the latter will be substantially equivalent to those toy vehicles which simulate such animals.

If various accessories of different designs are prepared, a variety of goods having different external appearances can easily be provided by suitably selectively attaching these accessories to toy vehicles.

Further, selling such accessories alone will allow consumers to attach them to their own toy vehicles to enjoy changes in the external appearance of their toy vehicles.

According to a preferred embodiment, an accessory is attached to a toy vehicle comprising a vehicle body forwardly formed with a hood and rearwardly formed with a seat for a child to sit thereon, a plurality of rotatable wheels disposed under the vehicle body, and a handle post, extending upwardly from the front region of the vehicle body provided with grips for a child sitting on the seat. This accessory is divided into a first portion simulating the driver's face and a second portion simulating the driver's hands and the steering wheel, said first portion being positioned rearwardly of the second portion.

DESCRIPTION OF THE PREFERRED EMBODIMENTS AND OF THE BEST MODE OF THE INVENTION

Figure 1:
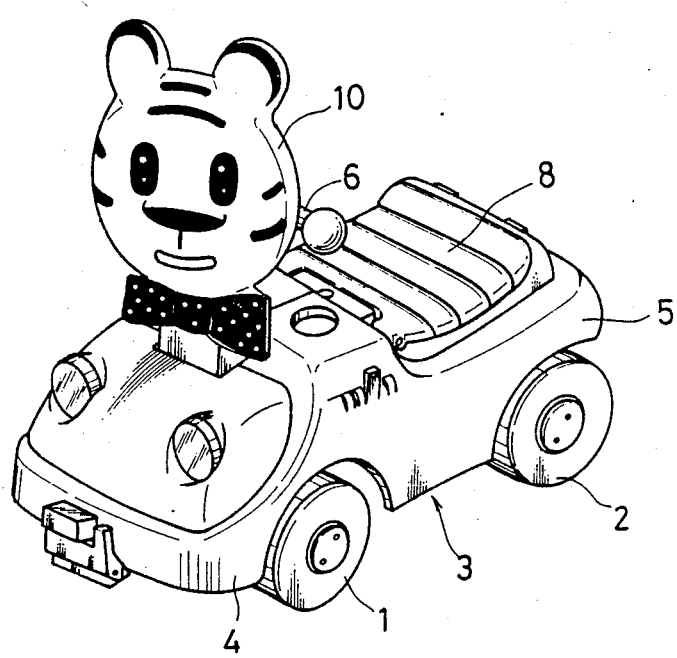
FIG. 1 is a perspective view showing the external appearance of a first embodiment of the invention.

A toy vehicle shown in FIG. 1 has two front wheels 1 and two rear wheels 2 totalling four wheels, the vehicle body 3 being made, for example, of a rigid plastic material. The arrangement of the vehicle body 3 will now be described by dividing it into a front region 4 and a rear region 5.

Figure 2:
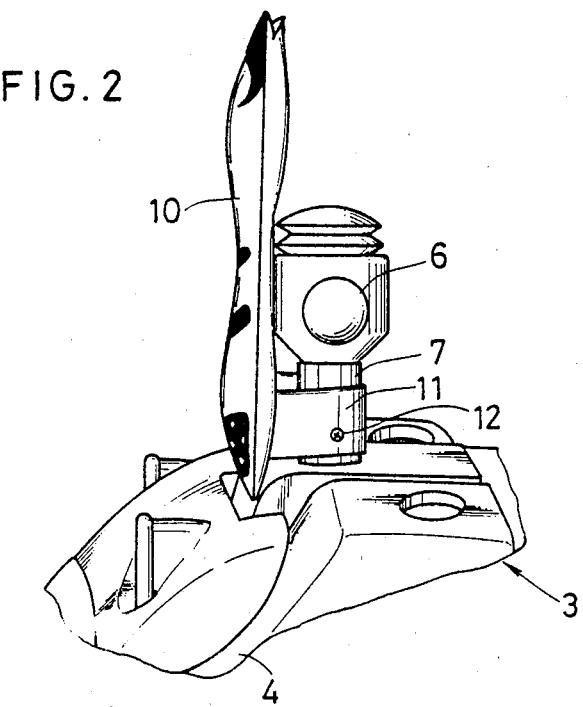
FIG. 2 is a view looking laterally at a portion of the front region 4 of the toy vehicle of FIG. 1.

In the front region 4 of the vehicle body 3, one of the grips 6 is shown in FIG. 1. The grips 6 are to be gripped by a child with his hands while he is riding the toy vehicle. The grips 6, as shown in FIG. 2, are formed on a handle post 7 projecting upwardly from the front region 4 of the vehicle body 3. In this embodiment, the grips 6 are also used as a steering handle and are arranged so that by rotatively manipulating the grips 6, the direction of the front wheels 1 can be changed by means of the handle post 7.

The rear region 5 of the vehicle body 3 is formed with a seat 8 for a child to sit on, as shown in FIG. 1.

In such toy vehicles, an accessory 10 representing the face of an animal, for example, a "tiger" that is considered to be the driver of the vehicle. This accessory 10 has an attaching member 11 added thereto which extends from the back of the accessory 10 for attaching the accessory 10 to the handle post 7. In this embodiment, the attaching member 11 is in the form of a band adapted to receive the handle post 7. More specifically, the attaching member 11 receives the handle post 7 when the latter is separated from the vehicle body 3, and is firmly fixed to the handle post 7 by a screw 12 which is used for attaching the handle post 7 to a shaft (not shown) which extends from the vehicle body 3 and transmits a direction changing movement for the front wheels 1. Since the attaching member 11 is formed of a relatively broad band, it functions to prevent tilting of the accessory 10 when the latter is fixed to the handle post 7.

The accessory 10 is in the form of a flat plate as a whole, having a stuffed toy construction with a suitable degree of elasticity. As shown in cross section in FIG. 3, the accessory has a relatively rigid core material 13 placed in the center thereof, said core material 13 being surrounded on opposite sides thereof with a cover sheet 15 with a cushion material 14 interposed therebetween. With this construction, the core material 13 imparts suitable stiffness to the accessory 10, thereby enabling the accessory 10 to maintain its upright position extending from the front region 4 of the vehicle body 3, as shown in FIGS. 1 and 2. Further, the presence of the cushion material 14 makes the outer surface of the cover sheet 15 feel elastic.

In addition, the pattern applied to the surface of the accessory 10 can be realized for example, printing on the cover sheet 15.

Figure 4:
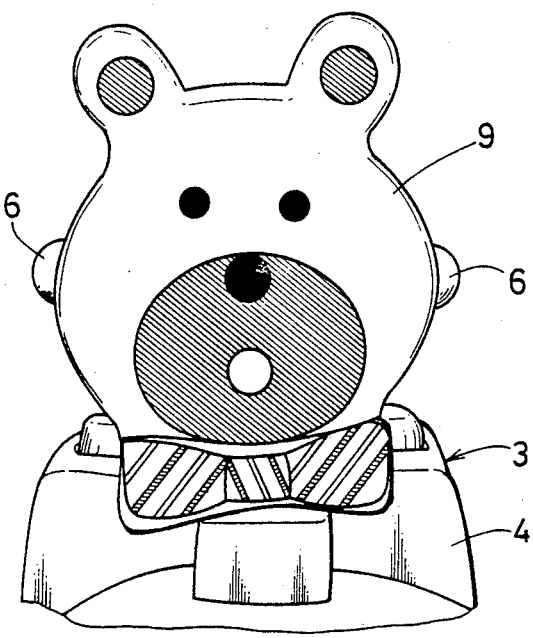
FIG. 4 is a front view of another embodiment of the invention.

In the embodiment describe above, can be seen in FIG. 1, the accessory 10 is the caricatured form of the face of a "tiger," but such facial form may be a caricature of the face of a "bear," as shown in FIG. 4, or the face of other animal or the face of a human being. In FIG. 4, an accessory 9 representing the face of a "bear" disposed in the front region 4 of the vehicle body 3 is shown in front view, with a portion of the vehicle body 3 being cut away.

The attaching member 11 for attaching the accessory 10 or 9 has been shown in the form of a band that has been fixed to the handle post 7 by a screw 12. However, in the case of a band-like attaching member 11, an adhesive agent or the like may be used to fix it to the handle post 7 or without using any special fixing means the attaching member may be fixed in that it is elastically contacted with the handle post 7. Further, instead of the band-like attaching member 11, a relatively broad ribbon may be tied to the handle post 7. Alternatively, an attaching member adapted to be connected by a snap joint may be attached to the accessory while another attaching member pairing up with the first attaching member may be provided on the handle post 7.

In the above embodiment, the handle post has been rotatable for changing the direction of the front wheels 1; this invention is also applicable to a toy vehicle in which the grips 6 function simply as supports for the child.

While the illustrated embodiment shows a four-wheeled toy vehicle, the accessory according to the invention can also be attached to a child's tricycle.

Figure 5:
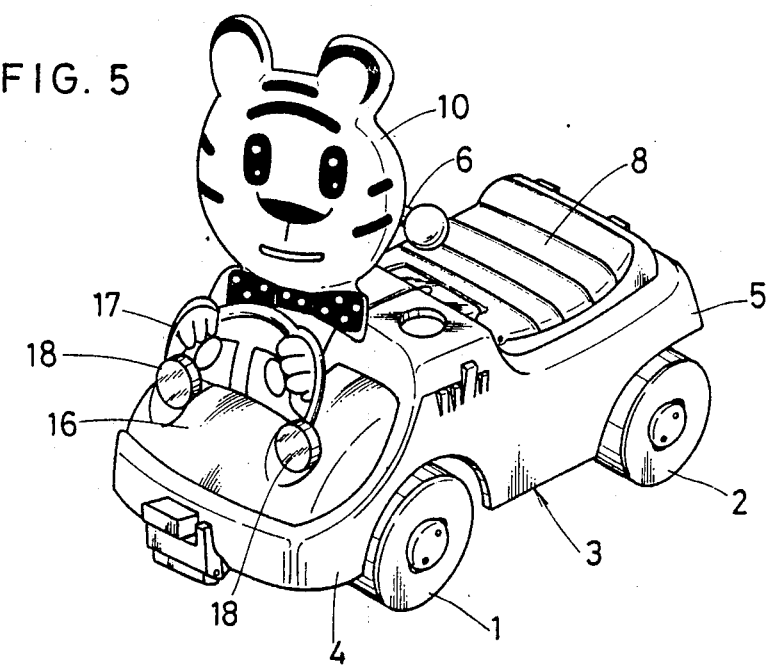
FIG. 5 is a perspective view showing the external appearance of a further embodiment of the invention.
Figure 6:
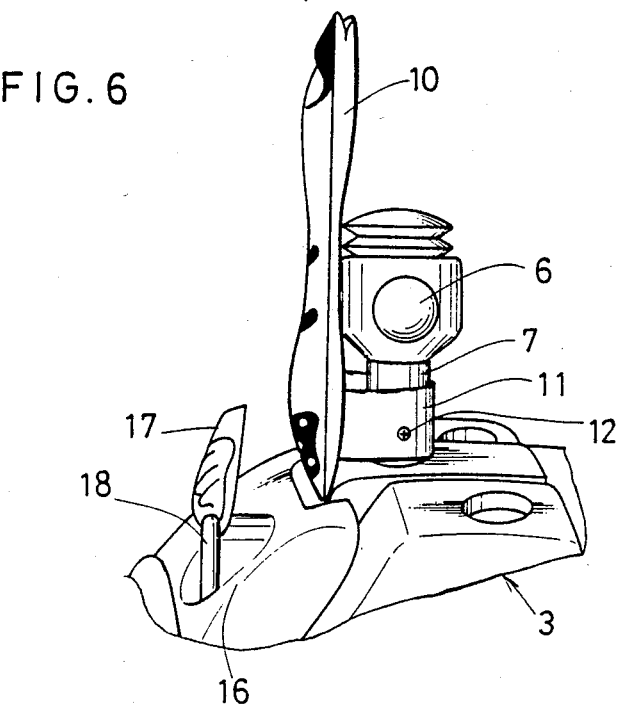
FIG. 6 is a view looking laterally at a portion of the front region of the toy vehicle of FIG. 5.

A further embodiment of the invention is shown in FIGS. 5 and 6. The toy vehicle shown therein differs from the embodiment described with reference to FIGS. 1 through 3 as described below. In addition, in FIGS. 5 and 6, the portions corresponding to those shown in FIG. 2 are given like reference numerals and a duplicate description thereof is omitted.

Referring to FIGS. 5 and 6, a hood portion 16 formed in the front region 4 of the vehicle body 3 has a second accessory 17 attached thereto. The second accessory 17, which is prepared separately from the first accessory 10, is in the form of a steering wheel with the driver's hands (front feet) gripping the steering wheel. As best shown in FIG. 6, the first accessory 10 is positioned rearwardly of the second accessory 17. By separating the first and second accessories 10 and 17 from each other and positioning them one behind the other in this manner, it is possible for the toy vehicle to convey a more pronounced three-dimensional appearance.

The second accessory 17 is attached by using plug-in members 18 simulating head lights installed on the hood portion 16. That is, the plug-in members 18 are removably fitted in the hood portion 16 and the second accessory 17 is attached by having portions thereof held by the fitting portion of each of the plug-in members 18.

Figure 3:
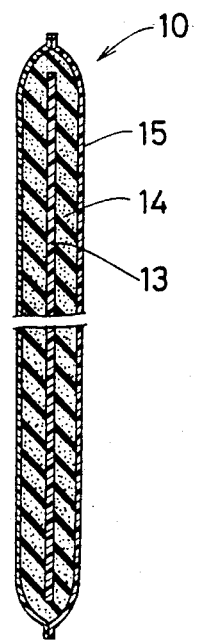
FIG. 3 is a view showing the cross-sectional construction of an accessory 10.

The second accessory 17, like the first accessory 10, has a cross-sectional construction as shown in FIG. 3. That is, it is in the form of a flat plate as a whole, having a stuffed toy construction with a suitable degree of elasticity.

Figure 7:
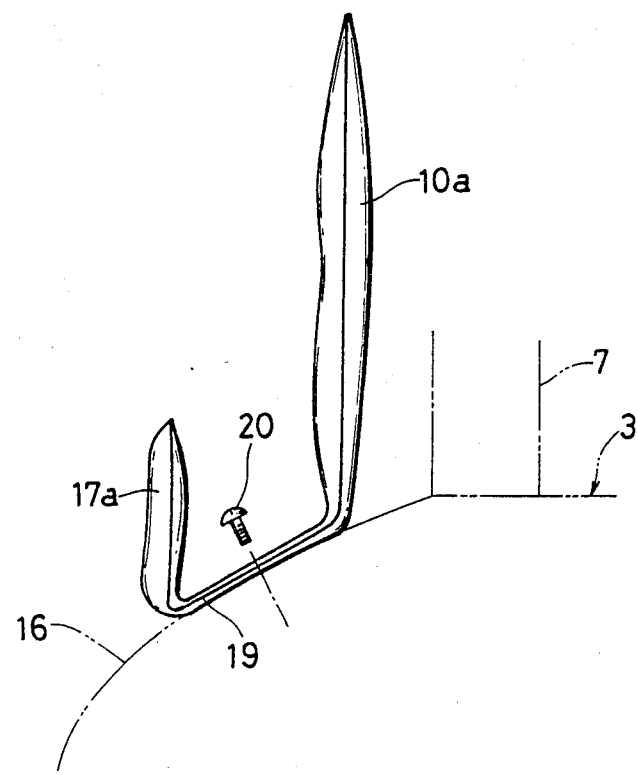
FIG. 7 is a side view of an accessory used in still another embodiment of the invention.

The first and second accessories 10 and 17 shown in FIGS. 5 and 6 may be arranged to represent the driver's face and hands and a steering wheel in connected construction, as shown in FIG. 7. In FIG. 7, a first portion 10a corresponds to the aforesaid first accessory 10 and a second portion 17a to the second accessory 17. A connecting portion 19 which interconnects the first and second portions 10 and 17a is attached to the front region of the vehicle body 3 as by a screw 20 as said connecting portion is contacted with the hood portion 16. In the accessory shown in FIG. 7, to maintain the first and second portions 10a and 17a in their upright position, a core material (not shown) extending from the first portion 10a to the second portion 17a is inserted.

Although the present invention has been described and illustrated in detail, it is clearly understood that the same is by way of illustration and example only and is not to be taken by way of limitation, the scope of the present invention being limited only by the terms of the appended claims.

What is claimed is:

1. A toy vehicle comprising front and rear regions; and upwardly projecting handle post disposed in said front region and comprising grips to be gripped by a child with his hands; and a seat formed in said rear region for a child to sit on; a first accessory simulating a driver's face, and attaching means to said first accessory for attaching the first accessory to said handle post or some other area adjacent said handle post; said first accessory being in the form of a flat plate as a whole and being of a stuffed toy construction comprising a relatively elastic core material, a cover sheet, and a cushion material interposed between said core material and said cover sheet.

2. The toy vehicle of claim 1, wherein said attaching means comprises an attaching member in the form of a band bent in a U-shape to surround said handle post.

3. The toy vehicle of claim 1, further comprising a second accessory simulating a steering wheel gripped by a driver with his hands, said second accessory being positioned forwardly of said first accessory.

4. The toy vehicle of claim 1, further comprising a hood in said front region, said hood being provided with a plug-in member which is removably fitted therein, said second accessory being attached by having a portion thereof held by the fitting portion of said plug-in member.

5. A toy vehicle comprising a vehicle body with front and rear regions, a hood in said front region, a seat in said rear region for a child to sit on, a plurality of rotatable wheels disposed under said vehicle body, and a handle post extending upwardly from said front region of said vehicle body to support grips to be gripped by a child sitting on the seat, an accessory simulating a driver's face and hands and a steering wheel gripped by said hands, said accessory being attached to said front region of the vehicle body, said accessory being in the form of a flat plate as a whole and being of a stuffed toy construction comprising a relatively elastic core material, a cover sheet, and a cushion material interposed between said core material and said cover sheet.

6. The toy vehicle of claim 5, wherein said accessory is divided into a first portion simulating a driver's face and a second portion simulating the driver's hands and the steering wheel, said first portion being positioned rearwardly of said second portion.

7. The toy vehicle of claim 6, wherein said first portion is attached to said handle post.

8. The toy vehicle of claim 6, wherein said first portion is provided with a U-shaped band adapted to surround said handle post, said first portion being attached to said handle post by means of said band.

9. The toy vehicle of claim 6, wherein said hood has a plug-in member removably fitted therein, said plug-in member simulating a headlight, and wherein said second portion is attached by having a portion thereof held by a fitting portion of said plug-in member.

10. The toy vehicle of claim 5, wherein said accessory is of a continuous construction, representing the driver's face and hands and the steering wheel.

* * * * *